United States Patent
Yu

(10) Patent No.: US 10,371,170 B2
(45) Date of Patent: Aug. 6, 2019

(54) NOISE REDUCTION USING IGV FLOW EJECTIONS

(71) Applicant: PRATT & WHITNEY CANADA CORP., Longueuil (CA)

(72) Inventor: Hong Yu, Oakville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1370 days.

(21) Appl. No.: 14/691,688

(22) Filed: Apr. 21, 2015

(65) Prior Publication Data

US 2016/0312799 A1    Oct. 27, 2016

(51) Int. Cl.
   *F01D 9/04* (2006.01)
   *F04D 29/54* (2006.01)
   *F04D 29/56* (2006.01)
   *F04D 29/66* (2006.01)

(52) U.S. Cl.
   CPC ........... *F04D 29/667* (2013.01); *F01D 9/041* (2013.01); *F04D 29/542* (2013.01); *F04D 29/563* (2013.01); *F05D 2250/51* (2013.01); *F05D 2260/962* (2013.01)

(58) Field of Classification Search
   CPC .... F04D 29/667; F04D 29/668; F04D 29/666; F04D 29/663; F04D 29/664
   USPC .......................................................... 415/1
   See application file for complete search history.

(56) References Cited

U.S. PATENT DOCUMENTS

| | | | |
|---|---|---|---|
| 3,572,960 A | 3/1971 | McBride | |
| 3,751,909 A | 8/1973 | Kohler | |
| 4,883,404 A | 11/1989 | Sherman | |
| 6,439,840 B1 | 8/2002 | Tse | |
| 6,973,193 B1 | 12/2005 | Tse et al. | |
| 7,077,623 B2 | 7/2006 | Guemmer | |
| 7,967,556 B2 | 6/2011 | Gummer | |
| 8,613,597 B1* | 12/2013 | Liang | F01D 5/187 416/97 R |
| 8,807,943 B1* | 8/2014 | Liang | F01D 5/187 415/115 |
| 2009/0148273 A1* | 6/2009 | Suciu | F01D 5/022 415/159 |
| 2013/0280050 A1 | 10/2013 | Ansari et al. | |
| 2013/0323079 A1* | 12/2013 | Martin | F01D 5/186 416/97 R |

* cited by examiner

*Primary Examiner* — Justin D Seabe
*Assistant Examiner* — Jason Mikus
(74) *Attorney, Agent, or Firm* — Norton Rose Fulbright Canada LLP

(57) ABSTRACT

In one embodiment, a method for reducing noise generated by inlet guide vane (IGV) wake and rotor interaction in a turbine engine, the noise having acoustic energy substantially dominating at one or two frequencies, comprises altering noise frequencies to distribute the acoustic energy into a broadband frequency spectrum by ejecting fluid flows from holes located on a side near a trailing edge of at least one of a plurality of inlet guide vanes (IGVs), toward a rotor downstream of the IGVs to merge with an air flow guided by the side of the at least one of the IGVs for interfering with said IGV wake and rotor interaction.

18 Claims, 4 Drawing Sheets

NOISE REDUCTION USING IGV FLOW EJECTIONS

TECHNICAL FIELD

The application relates generally to turbine engines and more particularly, to improvements in reduction of noise levels in turbine engines.

BACKGROUND OF THE ART

Noise has been a customer satisfaction issue associated with the commercial airline industry since the introduction of the aero turbine engine. One of the noise generation sources is associated with the rotating turbo machinery itself, as the result of rapidly rotating blade rows disposed within the air/gas stream. For example, in modern aeroengines high speed compressors have very high rotor tip speeds and a relative tip Mach number greater than 1. The noise propagated forward through the inlet duct of such aeroengines is mainly due to flow interactions between the rotor and variable inlet guide vanes (IGVs) positioned in the inlet duct upstream of the rotor for guiding incoming airflow in a desired direction toward the rotor. Considerable effort has been directed toward quieting aeroengines. For example, noise absorbing materials, perforated buffer plates and other noise attenuation devices have been used in aeroengines for suppressing noise propagation through the engines.

Accordingly, there is a need for an improved method and apparatus for reducing the noise generated by aero turbine engines.

SUMMARY

A method for reducing noise in a turbine engine having a plurality of inlet guide vanes (IGVs) and a rotor downstream of the IGVs, the method comprising: 1) providing pressurized air from a pressurized air source in the engine to a hollow portion of at least one of the IGVs; and 2) ejecting the pressurized air in the hollow portion through a plurality of holes located on a side of the at least one of the IGVs, at an angle of between 2 and 12 degrees with respect to an air flow guided by the side of that at least one of the IGVs toward the rotor to merge with said air flow for interfering with IGV wake and rotor interaction.

A compressor of a turbine engine, comprising a plurality of circumferentially spaced inlet guide vanes (IGVs) supported in an annular inlet duct of the turbine engine, a rotor positioned downstream of the IGVs, a plurality of discrete holes defined on a side near a trailing edge of at least one of the IGVs, the discrete holes being in fluid communication with a source of a pressurized air downstream of the rotor and being oriented in a direction at an angle between 2 and 12 degrees with respect to an air flow guided by the side of the at least one of the IGVs to eject respective fluid flows from the discrete holes at said angle to mix merge with said air flow, causing interference with an inlet guide vane (IGV) wake and rotor interaction.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
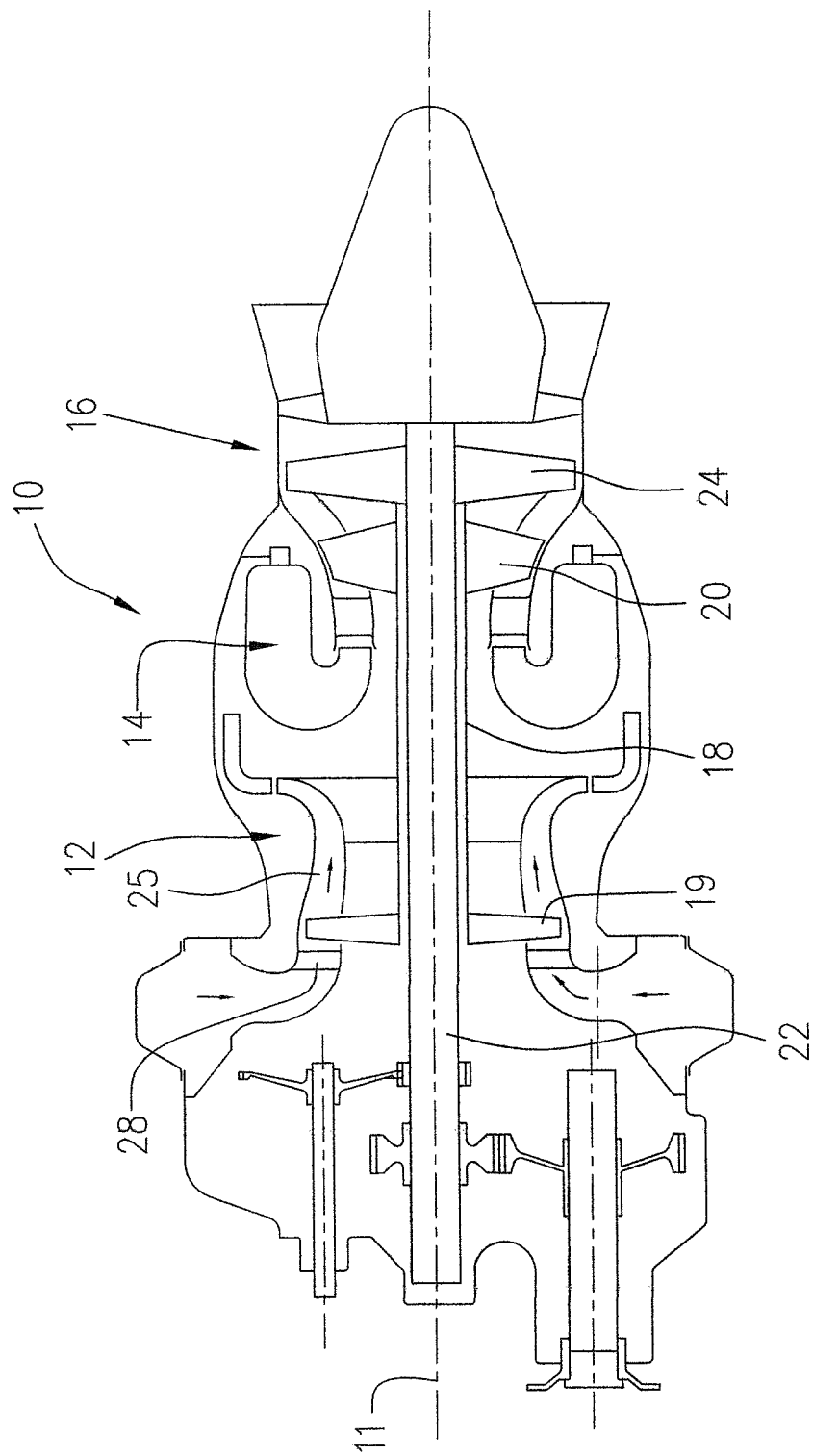
FIG. 1 is a schematic side cross-sectional view of an aero turbine engine as an example illustrating application of the described subject matter.

FIG. 1 illustrates an example of an aero turbine engine. In this example, the turbine engine 10 is a turboshaft engine generally comprising in serial flow communication; a compressor section 12 for pressurizing air, a combustor 14 in which the pressurized air is mixed with fuel and ignited for generating an annular stream of hot combustion gases, and a turbine section 16 for extracting energy from the combustion gases.

The turbine engine 10 in this example can be seen to include a high pressure spool assembly 18 including a compressor rotor 19 and a high pressure turbine rotor 20, and a low pressure spool assembly 22 including a low pressure turbine rotor 24. The low pressure spool assembly 22 is connected to a power shaft (not numbered) by a gear arrangement (not shown).

In this example, the compressor section 12 defines an annular air flow duct 25 having an inlet section (not numbered) to direct an air flow from a radial and inward direction to an axial direction and to enter the annular air flow duct 25 of the compressor section 12, as indicated by the arrows (not numbered). A plurality of circumferentially spaced variable inlet guide vanes 28 (IGVs) are mounted to the compressor section 12, and are positioned and rotatably supported within an axial part of the inlet section of the air flow duct 25, immediately upstream of the compressor rotor 19. The variable IGVs 28 may each be rotatable about a rotational axis 26 (see FIG. 2), which extends substantially in a radial direction. The variable IGVs 28 can be adjusted in different angular settings by an actuating apparatus (not shown) for guiding the inlet flow from a substantially axial direction as indicated by arrow 30 into a direction indicated by arrow 46 toward the compressor rotor 19 at a selected pitch angle with respect to a central axis 11 of the engine 10.

It should be noted that the terms "axial", "radial" and "circumferential" used for various components above and below are defined with respect to the central axis 11 of the engine and the terms "upstream" and "downstream" are defined with respect to the air flow passing through the annular duct 25 and the engine 10.

Referring to FIGS. 1-5, the rotor 19 positioned downstream of the variable IGVs 28 may include a plurality of circumferentially spaced rotor blades 32. The rotor blades 32 rotate about the central axis 11 of the engine for pressing air flow channeled therethrough, causing a tonal noise. I should be noted that the air flow to be compressed by and channeled through the rotor blades 32, is directed in the annular duct 25 by the variable IGVs 28, creating a IGV wake exiting the variable IGVs at the pitch angle into the rotor 19. Therefore, the aerodynamic interaction between the IGV wake and the rotor, adds a significant contribution in particular to the forward projected noise in the annular duct 25. The interaction tones are generated in the region between the variable IGVs 28 and the rotor blades 32 within the annular duct 25. Such noise may have an acoustic spectrum including a broadband noise level and tones at a blade passage frequency (BPF) and its harmonics. These tones usually have noise levels much higher than the broadband noise level. Therefore, redistributing the acoustic energy from the one or two dominant frequencies to the broadband can significantly reduce acoustic pollution to the environment.

The variable IGVs 28 according to one embodiment are configured to have a hollow structure (as shown by the broken lines in FIG. 2), or to have internal passages. One or more of the variable IGVs 28 may define a plurality of discrete holes 34 located on a side of the respective variable IGVs 28, adjacent a trailing edge 36 thereof, for example, in an axial location in 70-95% of chord from the leading edge. The variable IGVs 28 according to this embodiment may have a cambered (convex) suction side 38 and a generally flat pressure side 40 extending between a leading edge 42 and the trailing edge 36 of the respective variable IGV 28. (The flat pressure side 40 represents a chord of the vane of the embodiment.) Alternatively, the pressure side 40 may be concave or convex.

The holes 34 may be optionally located on the pressure side 40 near the trailing edge 36 of the respective variable IGV 28 and may be oriented in a direction indicated by arrow 44 at an angle A with respect to the direction indicated by arrow 46 (the direction in which the axial air flow 30 in the annular duct 25 is guided by the pressure side 40 of the IGVs toward the rotor blades 32). The angle A may be in a range from 2 degrees to 12 degrees.

One or more hollow variable IGVs 28 which have the holes 34 therein may be in fluid communication for example through pipelines 48, with a source of pressurized air such as a location in the annular duct 25, immediately downstream of the rotor 19 (where the static pressure of the compressed air is relatively high). Optionally, a stop valve 50 may be provided on the pipeline 48 for controlling or selectively discontinuing introduction of the pressurized air into the one or more hollow variable IGVs 28.

Therefore, when the valve 50 is open, fluid flow indicated by arrows 52 (see FIG. 2) is ejected from the respective holes 34 of the one or more variable IGVs 28 in the direction indicated by arrow 44 (see FIG. 3) toward the rotor blades 32 to merge with the variable IGV's guided air flow (which flows in the direction of arrow 46) at the angle A, causing interference in the aerodynamic interaction between the IGV wake and the rotor 19. As a result of such interference in the aerodynamic interaction between the variable IGV wake and the rotor, the acoustic power of the interaction noise at the one or two dominating frequencies is redistributed into the acoustic broadband frequency spectrum and therefore the noise generated by the IGV wake and rotor interaction can be reduced.

Optionally, the holes 34 may be defined in each of the variable IGVs 28, or may be defined in every second variable IGV 28.

Optionally the holes 34 in the respective variable IGVs 28 may be located axially in 40-95% of a vane span from a radial inner end of the respective variable IGVs 28.

Figure 2:
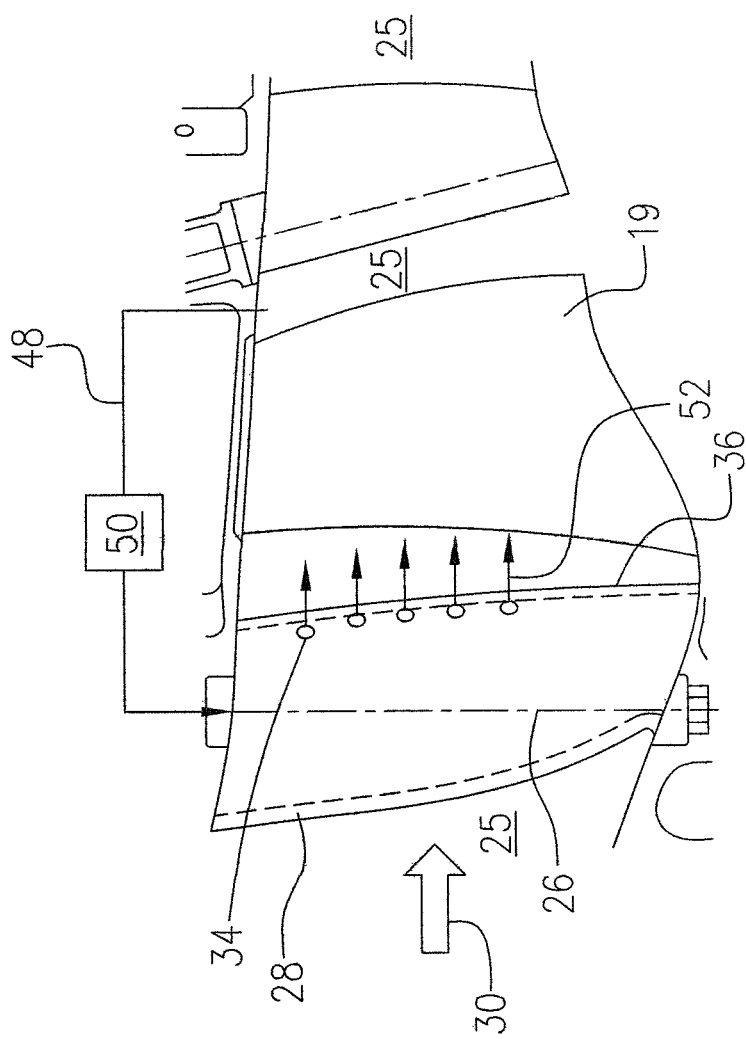
FIG. 2 is a partial schematic side cross-sectional view of the aero turbine engine of FIG. 1, illustrating an apparatus for reducing noise generated by inlet guide vane (IGV) wake and rotor interaction in the engine according to one embodiment.
Figure 3:
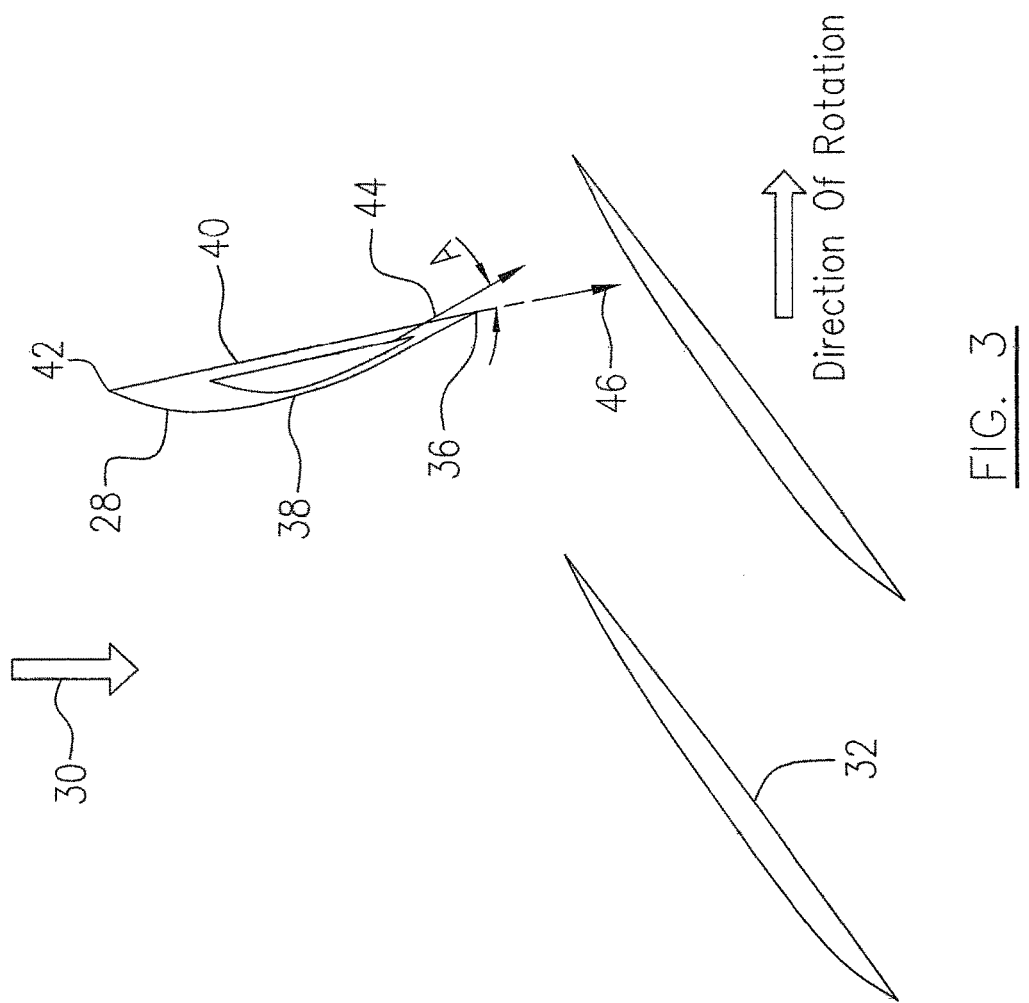
FIG. 3 is a schematic partial top view of the IGV and the rotor of FIG. 2, showing a fluid flow ejection from the IGV toward the rotor.
Figure 5:
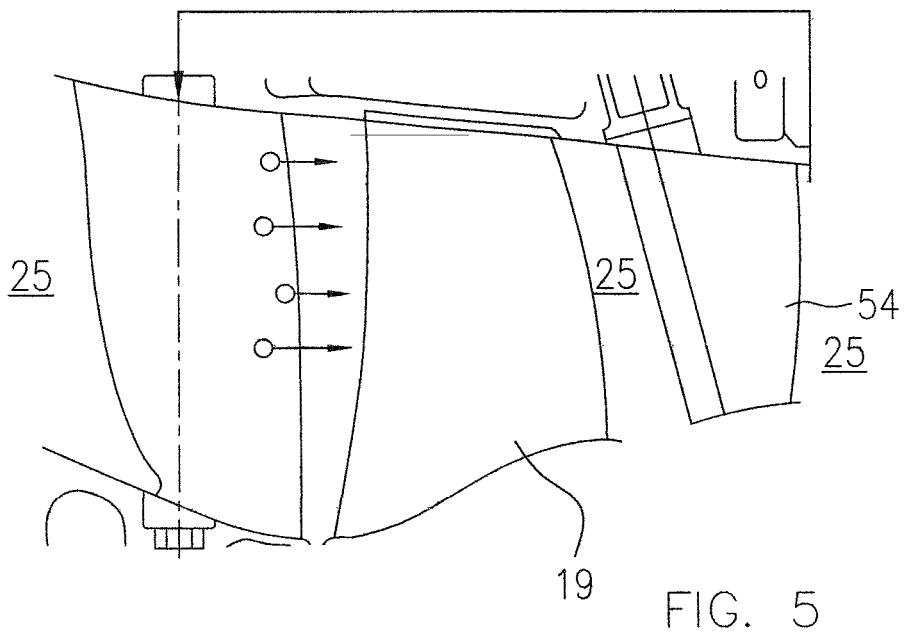
FIG. 5 is a schematic partial side cross-sectional view of the aero turbine engine of FIG. 1, showing the apparatus for reducing the noise generated by IGV wake and rotor interaction in the engine according to a further embodiment.

The holes 34 in the respective variable IGVs 28 may have different axial positions with respect to the trailing edge 36 of the respective variable IGV 28 as shown in FIG. 2, or may be axially located with respect to the trailing edge, in a staggered pattern as shown in FIG. 5.

Figure 4:
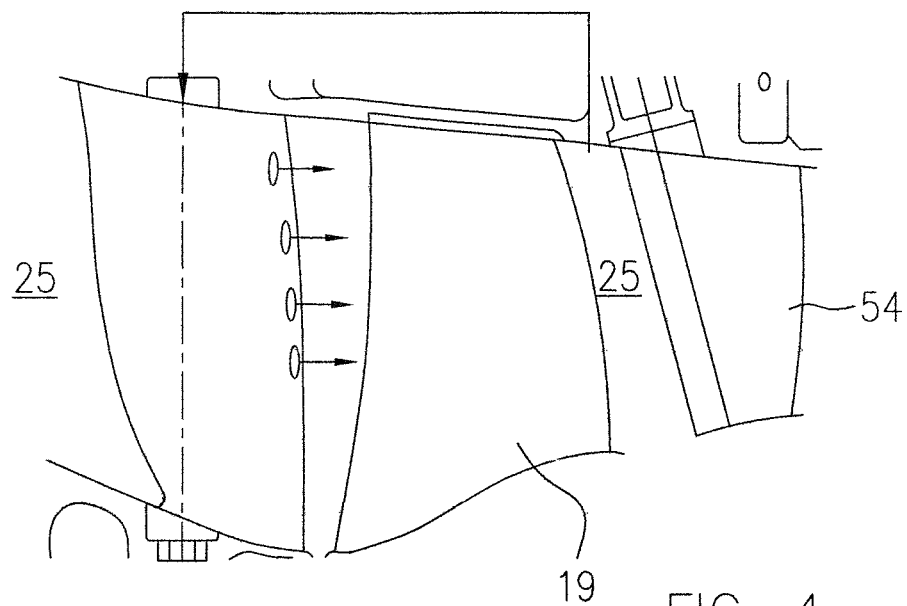
FIG. 4 is a schematic partial side cross-sectional view of the aero turbine engine of FIG. 1, showing the apparatus for reducing noise generated by IGV wake and rotor interaction in the engine according to another embodiment.

Optionally, the holes 34 may be circular as shown in FIGS. 2 and 5, or elliptical as shown in FIG. 4, or may be in other shapes, and the holes 34 may be configured in different sizes.

Optionally, the holes 34 may form patterns different from one variable IGV to another and the hole patterns may vary in numbers, shapes, sizes and axial positions with respect to the trailing edge 36 of the respective variable IGVs 28.

The above described alternative hole patterns, sizes and positions may be used to eject the fluid flows in various ways to miss-tune the IGV wake and rotor interaction. Therefore, selected use of those alternatives can advantageously distribute the acoustic energy from the dominant frequencies to a broadband frequency spectrum.

As shown in FIG. 5, the source of pressurized air supplied to the hollow variable IGVs 28 for fluid flow ejections, may optionally be a section of the annular duct 25, downstream of stator vanes 54. The stator vanes 54 may be axially positioned immediately downstream of the rotor 19.

The pressurized air introduced from the pressurized air source may be controlled such that a total ejection flow rate from the holes 34 in all the variable IGVs 28 may be less than 2% of the total air flow passing through and compressed by the rotor 19.

Variable inlet guide vanes have been taken as an example of the above-described subject matter, however the described subject matter may also be applicable to fixed IGVs positioned immediately upstream of the compressor rotor. The described subject matter may also be applicable to aero turbine engines of types different than that illustrated in FIG. 1. Although the inlet flow as shown in FIG. 1 is from a radial direction, the described subject matter is also applicable to axial inlet flow turbine engines.

The above-described embodiments effectively reduce compressor noise in the forward direction and have minimum impact on compressor efficiency and stall margin.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A method for reducing noise in a turbine engine having a plurality of inlet guide vanes (IGVs) and a rotor downstream of the IGVs, the method comprising:
   1) providing pressurized air from a pressurized air source in the engine to a hollow portion of at least one of the IGVs; and
   2) ejecting the pressurized air in the hollow portion through a plurality of holes located on an outer side of the at least one of the IGVs, at an angle of between 2 and 12 degrees with respect to an air flow guided by the outer side of the at least one of the IGVs toward the rotor to merge with said air flow for interfering with IGV wake and rotor interaction.

2. The method as defined in claim 1 comprising ejecting said pressurized air from the holes located on the outer side adjacent a trailing edge of each of the IGVs.

3. The method as defined in claim 1 comprising ejecting said pressurized air from the holes located on a pressure side adjacent a trailing edge of the at least one of the IGVs.

4. The method as defined in claim 1 comprising ejecting said pressurized air from the holes having different sizes or different axial positions with respect to a trailing edge of the at least one of the IGVs.

5. The method as defined in claim 1 comprising ejecting said pressurized air from the holes, the holes being radially located in 40-95% of a vane span from a radially inner end of the at least one of the IGVs.

6. The method as defined in claim 2 wherein a total ejection flow rate from the holes of all of the IGVs is less than 2% of a total air flow rate compressed by the rotor.

7. The method as defined in claim 2 comprising ejecting said pressurized air from the holes, the holes being in different hole patterns from one to another of the IGVs, each of the hole patterns having selected hole shapes, sizes and axial positions with respect to the trailing edge of the respective IGVs.

8. A compressor of a turbine engine, comprising a plurality of circumferentially spaced inlet guide vanes (IGVs) supported in an annular inlet duct of the turbine engine, a rotor positioned downstream of the IGVs, a plurality of discrete holes defined on an outer side of at least one of the IGVs, the holes being in fluid communication with a source of a pressurized air downstream of the rotor and being oriented in a direction at an angle between 2 and 12 degrees with respect to an air flow guided by the outer side of the at least one of the IGVs to eject respective fluid flows from the holes at said angle to merge with said air flow.

9. The compressor as defined in claim 8 wherein the holes are defined on a pressure side of the at least one of the IGVs.

10. The compressor as defined in claim 8 wherein the holes are axially located in 70-95% of chord from a leading edge of the at least one of the IGVs.

11. The compressor as defined in claim 8 wherein the holes are radially located in 40 to 90% of a vane span from a radially inner end of the at least one of the IGVs.

12. The compressor as defined in claim 8 wherein the holes are defined in each of the IGVs.

13. The compressor as defined in claim 8 wherein the holes are defined in every second one of the IGVs.

14. The compressor as defined in claim 8 wherein the holes are circular.

15. The compressor as defined in claim 8 wherein the holes are elliptical.

16. The compressor as defined in claim 8 wherein the holes are axially located with respect to a trailing edge of the at least one of the IGVs, in a staggered pattern.

17. The compressor as defined in claim 8 wherein the holes are in fluid communication with a hollow configuration of the at least one of the IGVs, the hollow configuration being in fluid communication with said source of pressurized air downstream of the rotor.

18. The compressor as defined in claim 17 comprising a valve for selectively stopping the fluid communication between the source of pressurized air and the hollow configuration.

* * * * *